March 27, 1962 J. N. SCOTT, JR., ETAL 3,026,567
APPARATUS FOR INJECTION MOLDING OF PLASTIC MATERIALS
Filed Nov. 10, 1958 2 Sheets-Sheet 1

INVENTORS
J.N. SCOTT, JR.
D.L. ALEXANDER
BY
*Hudson and Young*
ATTORNEYS

March 27, 1962  J. N. SCOTT, JR., ETAL  3,026,567
APPARATUS FOR INJECTION MOLDING OF PLASTIC MATERIALS
Filed Nov. 10, 1958                          2 Sheets-Sheet 2
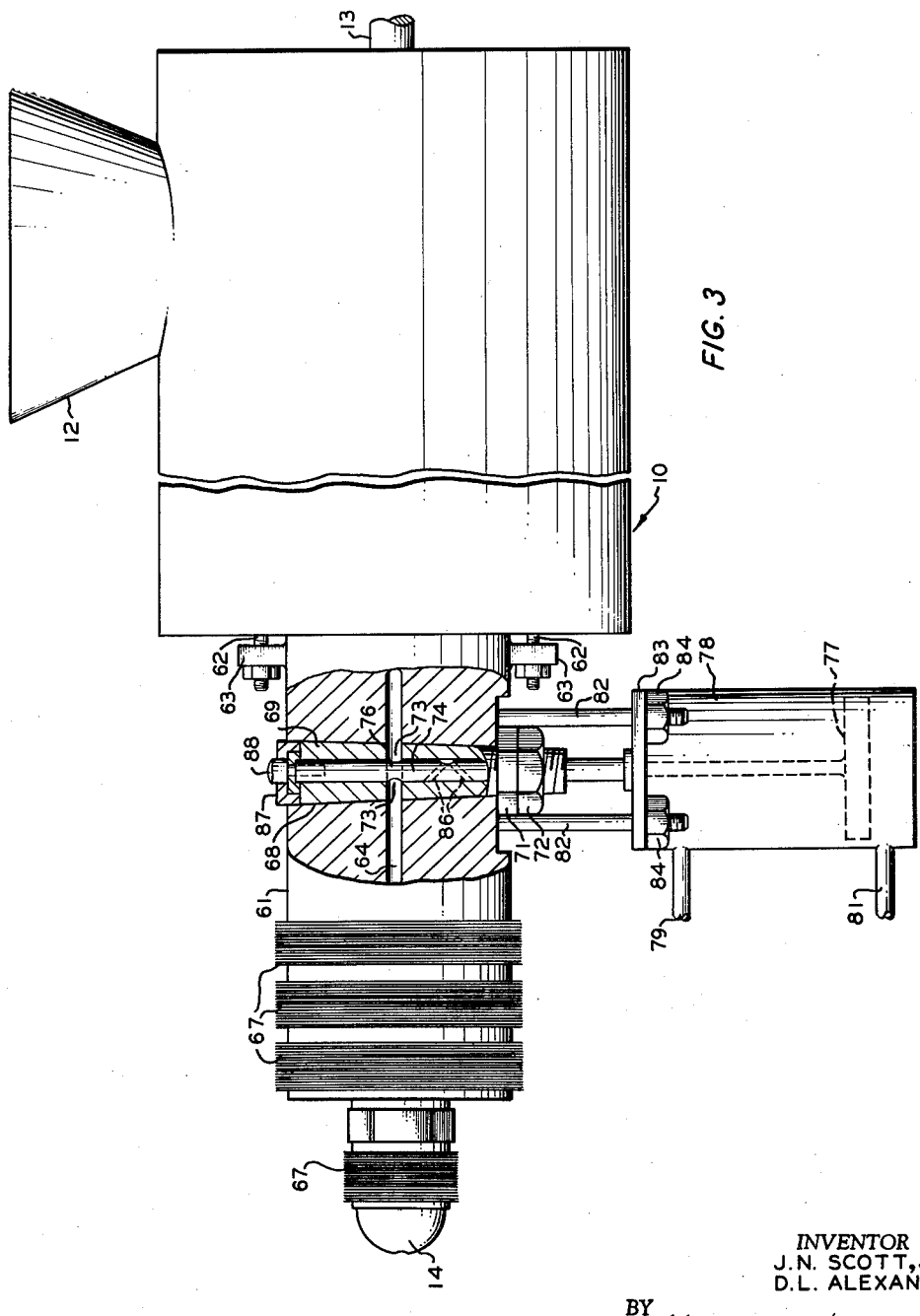
INVENTOR
J.N. SCOTT, JR.
D.L. ALEXANDER
BY
ATTORNEYS

United States Patent Office 3,026,567
Patented Mar. 27, 1962

3,026,567
APPARATUS FOR INJECTION MOLDING OF PLASTIC MATERIALS
John N. Scott, Jr., and Doyle L. Alexander, Bartlesville, Okla., assignors to Phillips Petroleum Company, a corporation of Delaware
Filed Nov. 10, 1958, Ser. No. 772,841
10 Claims. (Cl. 18—30)

This invention relates to the injection molding of thermoplastic materials. In one aspect, it relates to injection molding apparatus suitable for use in the manufacture of plastic articles.

Conventional molding apparatus of the injection type usually includes an injection or heating cylinder having associated therewith an injection plunger or piston. The injection plunger reciprocates in the bore of the heating cylinder in such a manner as to permit the solid plastic material to be molded to enter the cylinder on the withdrawal stroke of the plunger. On the compression stroke of the plunger, the plastic material, now in a molten state, is forced from the injection cylinder through a nozzle and thence through runners or passages and sprues into the cavities of the mold. In order to ensure that the molten plastic material completely fills the mold cavities in a minimum of time, it has been found to be desirable to provide for precompression of the molten plastic material prior to its injection into the mold cavities. One arrangement of apparatus which accomplishes this precompression of the molten material employs separate valves at each of the mold gates. This type of apparatus results in a great increase in the original cost of the mold as well as in the maintenance costs necessary to keep the rather complicated apparatus in operation.

It is, therefore, an object of this invention to provide an improved injection molding apparatus.

Another object of the invention is to provide a novel valve means for use in injection molding apparatus whereby the molten plastic material is precompressed prior to its introduction into the mold cavities.

Other and further objects and advantages of the invention will become apparent to those skilled in the art upon consideration of the accompanying disclosure.

The present invention is concerned with an improved apparatus for the injection molding of plastic materials. In injection molding apparatus comprising a heating means, means for discharging molten plastic material under pressure from the heating means, and a mold having formed therein a sprue which is in communication with the discharge means, the invention broadly resides in the improvement which comprises a valve means associated with the discharge means for interrupting the flow of molten plastic material through the discharge means. It has been discovered that the desired precompression of the molten plastic material in the heating means can be accomplished by the utilization of a single valve means associated with the discharge means of the injection molding apparatus heating chamber. The apparatus of this invention as compared to conventional apparatus utilizing separate valves at the mold gates makes possible a considerable saving in the cost of molds as well as a great reduction in maintenance costs. Furthermore, since the valve means is associated with the discharge means, the apparatus is much more versatile, the advantages of operation being obtainable with any type of standard mold.

The materials which are molded in accordance with the present invention can be broadly defined as being thermoplastic synthetic resins. The invention is particularly applicable to materials which can be defined as high density, highly crystalline solid polymers, although low density, low crystallinity polymers can also be employed. The high density, highly crystalline solid polymers often have an inherent viscosity of at least 0.8, preferably an inherent viscosity between 1.2 and about 10, as determined from a solution of 0.1 gram of polymer in 50 cc. of tetralin at 130° C. The polymers also have a crystallinity of at least 70 percent, preferably at least 80 percent, and more desirably at least 90 percent, at 25° C. The crystallinity of the polymers can be determined by measurements of nuclear magnetic resonance (Wilson and Pake, Journal of Polymer Science, 10, 503 (1953)), using a sample of polymer which is in a state approaching equilibrium at 25° C. An approach to this equilibrium state can be achieved by heating the polymer sample to a temperature about 50° C. above its crystalline melting point, maintaining the sample at this temperature for about one hour, and then cooling to 25° C. at a rate characterized by fall of about 1.5° C. per minute at 135° C. The softening point of the polymer will vary with the particular polymer used, increasing as the density and crystallinity of the polymer increases. Generally, the softening point of the high density solid polymer is about 250° F., preferably in the approximate range of 250 to 300° F., and is several degrees higher, e.g., about 10° F., than the melting point of the polymer.

Highly crystalline polymers having the above-described properties are preferably produced by the method described in U.S. Patent No. 2,825,721 of J. P. Hogan and R. L. Banks, issued on March 4, 1958. As described in detail in the Hogan and Banks patent, the polymers to be molded in accordance with the present invention can be produced by contacting an aliphatic 1-olefin with a catalyst comprising as its essential ingredient from 0.1 to 10 or more weight percent chromium in the form of chromium oxide, preferably including a substantial amount of hexavalent chromium. The chromium oxide is ordinarily associated with at least one other oxide, particularly at least one oxide selected from the group consisting of silica, alumina, zirconia and thoria. It is preferred that the plastic materials which are to be molded in accordance with this invention be polymers of ethylene or propylene or mixtures of ethylene and other unsaturated hydrocarbons, e.g., mixtures of ethylene with minor amounts of monoolefins containing up to and including 6 carbon atoms per molecule, such as propylene, 1-butene, and 1-pentene.

While it is preferred to use in the practice of this invention polymers produced in accordance with the Hogan and Banks process, it is to be understood that polymers produced by other methods can also be employed. For example, a polymer which can be advantageously used can be produced by contacting on olefin, such as ethylene or propylene, with a catalyst comprising a mixture of an organometallic compound, such as an aluminum trialkyl, and a halide of a group IV metal of the periodic table, such as titanium tetrachloride. In another method for producing a suitable polymer, an olefin, such as ethylene, is polymerized in the presence of a catalyst comprising an organometallic halide, such as ethylaluminum dichloride, and a halide of a group IV metal, such as titanium tetrachloride. Although it is usually preferred to utilize the above-mentioned polymers, it is to be realized that the invention is broadly applicable to the molding of thermoplastic materials and that polymers such as polystyrene, polyvinyl chloride, copolymers of vinyl chloride and vinylidene chloride, nylon, and the like, can be utilized in the practice of the invention.

A more comprehensive understanding of the invention can be obtained by referring to the drawing, in which:

FIGURE 3 is an elevational view, partly in section, illustrating another embodiment of the invention.

Figure 1:
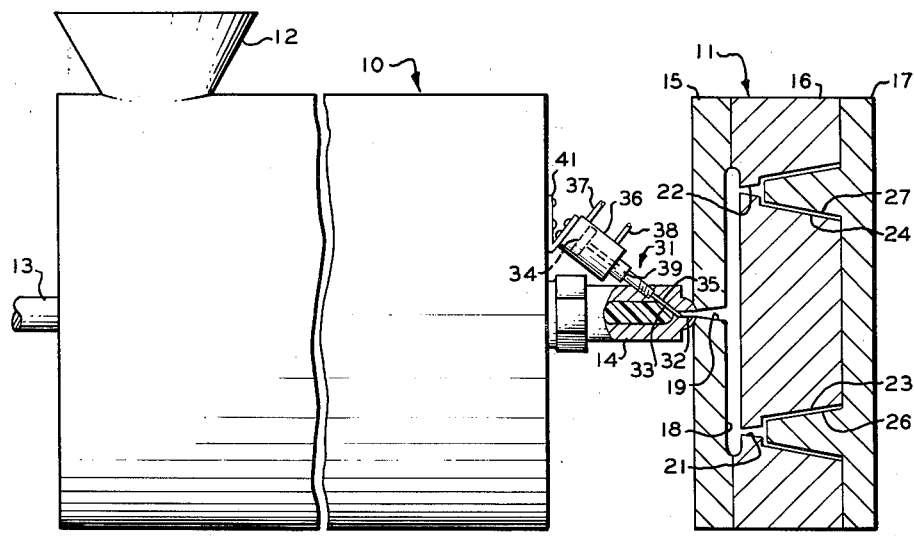
FIGURE 1 is an elevational view, partly in section, illustrating one embodiment of the invention.

Referring now to the drawing, and in particular to FIGURE 1, the injection molding apparatus includes two principal parts, namely, heating or injection cylinder 10 and mold 11. The solid plastic material, usually in granular form, is introduced into heating cylinder 10 through hopper 12. The heating cylinder is provided with a heating means for converting the solid plastic material to a molten condition. A plunger 13 reciprocates in the bore of the heating cylinder, thereby providing means for discharging the molten material through nozzle 14. Heating cylinder plunger 13 is usually connected to a hydraulic system comprising a hydraulic cylinder and piston (not shown), which operates to move the plunger in the bore of the heating cylinder. The end of nozzle 14 fits in a depression formed in mold 11 so that the passageway through the nozzle is in alignment with sprue 19. Suitable clamping or holding devices can be provided to ensure that the nozzle and mold are maintained in position with respect to one another. It is to be understood that it is not intended to limit the present invention to a heating cylinder of any particular construction since any suitable heating chamber with a nozzle can be employed.

Mold 11 comprises three principal parts which are designated herein as runner plate 15, cavity plate 16 and core plate 17. Although the mold illustrated in the drawing is of the type commonly termed a 3-plate mold, it is to be understood that the present invention is applicable to any type of mold. For example, it can be employed with a mold of the type usually referred to as a hot runner mold in which heating means are employed to maintain the plastic material in the runner in a molten condition. The invention is applicable to single cavity as well as to multi-cavity molds, and the molds can be lip or edge gated as well as center gated as shown in the drawing.

Identical grooves or channels are formed in adjacent surfaces of the runner and cavity plates. When the runner and cavity plates are pressed together as shown in the drawing, these grooves coincide and form runner or passageway 18. The particular runner illustrated in FIGURE 1 is in the shape of a straight tube having hemispherical ends. However, it is not intended to so limit the invention since molds with runners having configurations other than a straight line come within the scope of this invention. For example, it is within the purview of the invention to utilize a mold having a runner which is in the form of a circular tube. Connecting the discharge opening in nozzle 14 to runner 18 is sprue or passageway 19 formed in the runner plate. Sprues 21 and 22 formed in cavity plate 16 connect the runner with the space between the walls of cavities 23 and 24 and the surfaces of cores 26 and 27. The sprue openings into these spacings are usually termed the mold gates.

The mold of the injection molding apparatus includes means whereby the runner cavity and core sections can be maintained securely in position with respect to one another as well as with relation to heating cylinder 10. In conventional 3-plate molds, the runner and cavity plates are separated after each shot so that the solidified runner and sprues can be removed. Also, the core plate is separated from the cavity plate after each shot so that the molded article can be removed from the surfaces of the cores. This movement of the plates is often accomplished by means of a hydraulically operated piston which is operatively connected to a platen which is in turn attached to the core plate. Movement of the platen in the first instance separates the runner and cavity plates so that the solidified runner and sprue can be removed. Thereafter, further movement of the platen separates the core plate from the cavity plate so that the molded articles can be recovered. It is to be understood that any suitable device for moving the plates with respect to one another and for maintaining the plates securely fixed in position comes within the scope of the present invention.

The present invention is also applicable to the injection molding apparatus disclosed in the copending U.S. patent application Serial No. 767,309 filed on October 15, 1958 by J. N. Scott, Jr. As disclosed in detail in this application, an injection molding apparatus is provided which includes an enlarged runner system. The utilization of this runner system makes it possible to maintain the plastic material in a molten condition in the runner between cycles so that it is unnecessary to separate the cavity plate from the runner plate upon completion of each shot. The runner and cavity plates can be securely clamped together so that the mold is actually operated as a 2-plate mold during the molding operation.

In accordance with the present invention, nozzle 14 is provided with a valve means 31 whereby small discharge passageway or orifice 32 in the end of the nozzle can be closed. The valve means comprises a stem or plunger 33 having a piston 34 connected to its outer end. Valve stem 33 is moved in a diagonal passage or opening 35 formed in the side of nozzle 14 through the operation of piston 34 in hydraulic cylinder 36. Lines 37 and 38 furnish means whereby a hydraulic fluid can be introduced into and withdrawn from the hydraulic cylinder. Stem 33 also rides in guide member 39 which is affixed at one end to hydraulic cylinder 36 and has its other end threaded into the side of nozzle 14. The guide member also provides support for one end of hydraulic cylinder 36, the other end being supported by bracket 41 which is bolted to the ends of the heating cylinder and the hydraulic cylinder. The end of valve stem 33 seats in nozzle passageway 32 in such a manner that the end of the stem when in position completely closes the passageway. It is to be noted that the inner end of passageway 32 is shown as being formed at an angle which is equal to the angle that the stem makes with the horizontal.

The placement of the valve means so that valve stem 33 enters the side of nozzle 14 at an angle approaching the horizontal constitutes an important aspect of the instant invention. During the precompression of the molten material in the heating chamber, pressures as high as 20,000 p.s.i. are often developed. In spite of these high pressures, it has been found that by positioning the valve means at a slant with the valve stem pointing in a downstream direction, as shown in the drawing, the stem can be readily withdrawn when it is desired that the molten material leave the nozzle. The acute angle which the stem makes with the horizontal axis of the nozzle is desirably kept as small as the limitations of construction will permit. Usually, the angle is less than 45°, preferably between 15° and 30°, with angles below 15° being even more desirable.

Figure 2:
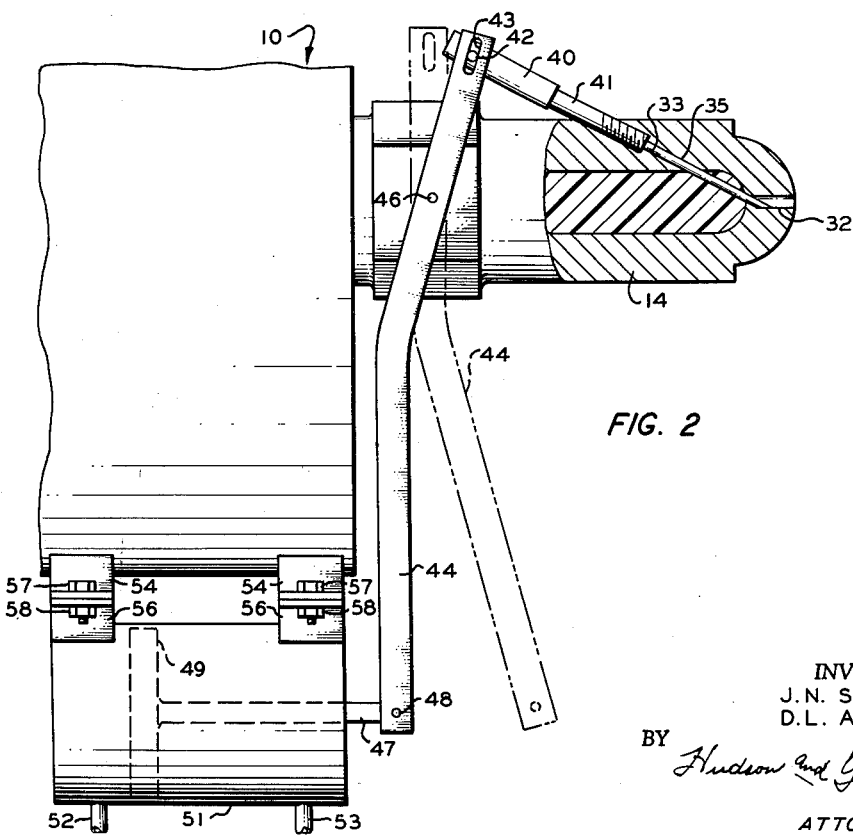
FIGURE 2 is an elevational view, partly in section, which shows a modification of the apparatus of FIGURE 1.

Referring to FIGURE 2 of the drawing, there is illustrated a modification of the valve means shown in FIGURE 1. Identical reference numerals have been employed to designate elements previously described in conjunction with FIGURE 1. In the apparatus of FIGURE 2, a slide member 40 is adapted to move on the outer surface of guide member 41 which is threaded into the side of nozzle 14. The outer end of valve stem 33 is attached to the interior of slide member 40 so that movement of this latter element causes the stem to move in guide member 41. The outer end of slide member 40 is provided at its outer end with a pin 42 which extends from either side of the member. The pin rides in elongated slots 43 formed in the Y-shaped end of yoke member 44. The yoke member is pivoted at an intermediate point by means of pin 46 which is fixedly attached to nozzle 14. The lower end of yoke 44 is moveably attached to one end of piston rod 47 by means of pin 48, the other end of rod 47 being connected to piston 49 positioned in hydraulic cylinder 51. Lines 52 and 53, which are connected to hydraulic cylinder 51, are for the introduction and withdrawal of hydraulic fluid from this cylinder. The hydraulic cylinder is suspended from heating cylinder 10 by means of clamps 54 and 56 attached, respectively, to the heating chamber and the hydraulic cylinder by bolts 57 provided with nuts 58.

In the operation of the apparatus shown in FIGURE 1, valve stem 33 of valve means 31 is positioned in its valve seat, as shown, at the start of a cycle of operation by introducing a hydraulic fluid into cylinder 36 through line 37. When in this position, the molten material formed in the heating cylinder cannot leave the nozzle through passageway 32. Accordingly, through the operation of the plunger in heating cylinder 10, the molten material therein is subjected to very high pressures, e.g., 20,000 p.s.i.g. and higher. When the pressure within the heating chamber has reached a preselected value, valve stem 33 is withdrawn from its seat in passageway 32 by introducing a hydraulic fluid into hydraulic cylinder 36 through line 38. The molten material can now leave the heating chamber through passageway 32 of nozzle 14. Because of the very high pressure developed in that cylinder, the molten material rapidly fills the runner system and connecting sprues and thereafter enters the spaces between cavities 23 and 24 and the surfaces of cores 26 and 27. It is very important that the molten material fill these spaces as rapidly as possible in order that a superior molded article can be produced. This is particularly true when molding articles having thin walls or articles having comparatively large surface areas. The molten material on entering a mold cavity immediately begins to solidify since the cavity and core plates are cold. If an extended period of time is required to fill the cavity, the articles obtained are often brittle or subject to warpage because of the uneven cooling operation. However, by precompressing the molten material in the heating chamber, as provided for by the present invention, the material completely fills the mold cavities in a minimum of time so that the molded article is subjected to uniform cooling conditions. As a result, the finished article is not brittle, nor is it subject to warpage.

The operation of the apparatus shown in FIGURE 2 is essentially the same as that of FIGURE 1. The principal difference in the operation of the two apparatus lies in the method whereby the valve stem is seated or withdrawn from its seat in passageway 32. Thus, movement of piston 49 through the operation of hydraulic fluid entering hydraulic cylinder 51 through line 53 causes yoke 44 to pivot about pin 46. The alternate position of yoke 42 is show in the drawing in broken lines. Movement of the yoke in this manner results in the withdrawal of valve stem 33 from its seat in nozzle passageway 32. This permits the molten plastic material to flow through the nozzle into sprue 19 of the mold as described hereinbefore in conjunction with FIGURE 1.

Referring now to FIGURE 3 of the drawing, there is illustrated a modification of the apparatus of this invention. Identical reference numerals have been employed in FIGURE 3 to designate elements which have been previously described in conjunction with FIGURE 1. The apparatus of FIGURE 3 includes an extension member 61 which is affixed to heating chamber 10. As illustrated, bolts 62, which ride in support members 63 attached to extension member 61, are threaded into the end of heating chamber 10 in order to provide means for attaching the extension member to the heating chamber. It is to be understood that any other suitable clamping or holding device can be employed to hold the extension member and the heating chamber in alignment so that passageway 64, as formed in the extension member, is in line with the bore of the heating chamber. Nozzle 14 is threadedly attached to the outer end of the extension member, the passageway extending through the nozzle being in alignment with passageway 64 of extension member 61. The extension member and the nozzle are provided with heating means, such as electrical heaters 67, which ensure that the plastic material remains in a molten condition. It is to be understood also that the nozzles of FIGURE 1 and FIGURE 2 can be provided, if desired, with a similar heating device.

Extension member 61 has a tapered opening 68 formed therein perpendicular to its horizontal axis in which a tapered cylinder 69 is disposed. Tapered cylinder 69 is held in position in the tapered opening by means of nut 71 which is threaded onto the end of cylinder 69. Lock nut 72 functions to maintain nut 71 firmly in position against the side of extension member 61. The sides of tapered cylinder 69 are provided with openings 73 which are in alignment with and have a diameter substantially equal to that of passageway 64 of the extension member. It is within the scope of the invention to omit the extension member, the tapered cylinder then being positioned in an opening formed in the body of the nozzle.

A plunger or piston 74 is positioned within tapered cylinder 69. The piston is also provided with an opening 76 which coincides with the openings in tapered cylinder 69 when the piston is in a lowered position as shown in the figure. Attached to the outer end of piston 74 is a hydraulic piston 77 which rides in hydraulic cylinder 78. Lines 79 and 81 attached to the hydraulic cylinder are for the introduction and withdrawal of hydraulic fluid which causes movement of piston 77. The hydraulic cylinder is suspended from extension member 61 by bolts 82 which are rigidly attached at one end to extension member 61. The other ends of bolts 82, which pass through plate 83 attached to the upper end of the hydraulic cylinder, are threaded with nuts 84 in order to maintain the cylinder in position on the bolts.

Piston 74 is also provided with openings which pass from one side to the other side of the piston. As shown in the drawing, two diverging passages 86 are provided so that when the piston is in a raised position, the common opening of the passages on the upstream side of the plunger is in alignment with passageway 64. However, with the other ends of the diverging passages do not communicate with passageway 64 on the downstream side of piston 74, the distance between the two openings being greater than the diameter of passageway 64. When the piston is raised, passageway 64 through extension member 61 is still blocked by the piston so that molten plastic material cannot flow from the heating chamber to nozzle 14. A cap 87 is attached to the end of piston 74 opposite hydraulic piston 77 by means of screw 88 which is threaded into the end of the piston. This cap aids in preventing the escape of molten material from around the piston and serves as a guide in limiting the amount of piston travel.

It is, of course, realized that the apparatus of FIGURE 3 can be utilized with any of the molds described hereinbefore with relation to FIGURE 1.

In the operation of the apparatus of FIGURE 3, upon commencement of a cycle of operation, piston 74 is in a raised position so that passageway 64 is closed. As a result, molten material cannot leave heating cylinder 10 through the operation of the heating cylinder plunger, and the molten material in this cylinder is precompressed. When the piston is in this position, the intersecting ends of passages 86 formed in the piston are open to the end of passageway 64 adjacent the heating cylinder. As a result, the very high pressure developed in heating chamber 10 is transmitted to the downstream side of piston 74 so that the piston in effect floats in tapered cylinder 69. By utilizing this type of structure, piston 74 can be easily and readily returned to its lowered position with opening 76 in alignment with passageway 64 even though very high pressures are developed in heating chamber 10. If such structure were not provided, it would be difficult, if not impossible, to move the piston from a raised to a lowered position.

When the pressure within heating chamber 10 has reached a preselected value, hydraulic fluid is introduced into hydraulic cylinder 78 through line 79, thereby causing the movement of piston 77 to a lowered position as shown in the drawing. When piston 77 is in this position, opening 76 through piston 74 is in alignment with passageway 64 through extension member 61. Molten material can now flow through passageway 64 from which it enters the passageway formed in nozzle 14. Upon leaving nozzle 14, the molten material flows through the sprues and passageways and enters the mold cavities as hereinbefore described in conjunction with FIGURE 1. It is thus seen that the apparatus of FIGURE 3 also provides an effective valve means whereby the molten plastic material in the heating chamber is precompressed prior to its introduction into a mold.

A more complete understanding of the invention can be obtained by referring to the following illustrative example which is not intended, however, to be unduly limitative of the invention.

*Example*

An injection molding apparatus having a nozzle provided with a valve means as shown in FIGURE 1 of the drawing is employed to form containers having a comparatively thin wall. The mold which is used was originally designed to part in two places, with the specimens being ejected at one mold parting and the solidified material formed in the runner system having to be forcibly removed from the other mold parting. In order to eliminate the time consuming task of removing the solidified material from the runner after each shot, this conventional mold is modified by increasing the diameter of the runner as disclosed in the aforementioned copending patent application of J. N. Scott, Jr. Modification of the mold in this manner makes it possible to operate the mold as a 2-plate mold.

A high density, highly crystalline polymer of ethylene is used in forming the molded containers. Initially, the needle of the valve means is in position in its seat in the passageway of the nozzle. The molten plastic material in the heating chamber is compressed to a pressure of about 20,000 p.s.i. at which time the needle is withdrawn from its seat. Molten material immediately enters the sprues and runner system of the mold and completely fills the space between the mold cavities and the core surfaces. The core plate is then withdrawn from the cavity plate, and the molded articles are removed from the cores. Each of the articles has a small sprue attached thereto which is easily removed in a cutting operation.

As soon as a shot of molten plastic material leaves the nozzle, the needle of the valve means is returned to its seat in the nozzle passageway. The plunger of the heating chamber now compresses the material in the heating chamber to the preselected pressure prior to the commencement of the next cycle of operation. The time required for each cycle is about 20 seconds. The molded articles obtained are in all cases free from brittleness and show no signs of warpage.

From the foregoing, it is seen that the instant invention provides a novel method and apparatus for the injection molding of thermoplastic materials. It will be apparent to those skilled in the art that many variations and modifications can be made in the present invention in view of the foregoing disclosure. Such modifications are believed to come within the spirit and scope of the invention.

We claim:

1. In injection molding apparatus comprising a heating cylinder having a nozzle attached to one end thereof, means for forcing molten plastic material from said heating cylinder through a passageway formed in said nozzle, and a mold having formed therein a sprue which is in communication with said passageway formed in said nozzle, the improvement in a valve means which comprises a valve stem positioned in an opening formed in a side of said nozzle, said opening extending to said passageway formed in said nozzle so that said valve stem when in an extended position closes said passageway, and said valve stem and said opening having a longitudinal axis which makes an acute angle with the longitudinal axis of said passageway formed in said nozzle so that the inner end of said valve stem in said opening points toward the outer end of said nozzle; and means for moving said valve stem within said opening formed in said nozzle, said means for moving being independent of the plastic pressure in said passageway and adapted to move said valve stem to said extended position prior to engagement of said sprue with said nozzle.

2. The injection molding apparatus of claim 1 in which said means for moving said valve stem comprises a hydraulic cylinder; hydraulic fluid inlet and outlet lines attached to said hydraulic cylinder; and a piston attached to the outer end of said valve stem, said piston being disposed within said hydraulic cylinder.

3. The injection molding apparatus of claim 1 in which said acute angle is less than 45°.

4. The injection molding apparatus of claim 1 in which said acute angle is in the range of 15° to 30°.

5. In injection molding apparatus comprising a heating cylinder having a nozzle attached to one end thereof, means for forcing molten plastic material from said heating cylinder through a passageway formed in said nozzle and through an orifice formed in the outer end of said nozzle, and a mold having formed therein a sprue which is in communication with said passageway formed in said nozzle, the improvement in a valve means which comprises a diagonal passageway formed in a side of said nozzle and extending from said orifice through said side of said nozzle in a direction toward said heating cylinder, an inner end portion of said diagonal passageway connecting said orifice to said passageway formed in said nozzle, and said diagonal passageway having a longitudinal axis which makes an acute angle with the longitudinal axis of said passageway formed in said nozzle; a valve stem positioned in said diagonal passageway, said valve stem being adapted to move in said passageway so as to close said orifice; and means attached to said valve stem for moving same within said diagonal passageway, said means for moving being independent of the plastic pressure in said passageway and adapted to move said valve stem to said extended position prior to engagement of said sprue with said nozzle.

6. The injection molding apparatus of claim 5 in which said means for moving said valve stem comprises a hydraulic cylinder having hydraulic fluid inlet and outlet lines attached thereto; and a piston attached to the outer end of said valve stem, said piston being positioned within said hydraulic cylinder.

7. The injection molding apparatus of claim 5 in which said means for moving said valve stem comprises a hydraulic cylinder having hydraulic fluid inlet and outlet lines connected thereto; a piston disposed within said hydraulic cylinder; a connecting rod attached to said piston and extending through one end of said hydraulic cylinder; and a linkage member pivotally attached at an intermediate point to a side of said nozzle adjacent said heating cylinder, one end of said linkage member being moveably attached to said valve stem and the other end of said linkage member being moveably attached to the outer end of said connecting rod.

8. In injection molding apparatus comprising a heating cylinder having a nozzle with a passageway formed therein attached to one end, means for forcing molten plastic material from said heating cylinder and through said nozzle passageway, and a mold having a sprue formed therein which is in communication with said nozzle passageway, the improvement in a valve means which comprises an opening formed in said nozzle, said opening intersecting said nozzle passageway and having a longitudinal axis which is substantially perpendicular to said nozzle passageway; a plunger positioned within said opening, said plunger having formed therein an opening which is parallel to said nozzle pasageway and said plunger having formed therein a pair of passageways diverging from a common opening to a pair of openings, the distance between said pair of openings being greater than the diameter of said nozzle passageway and said common opening in one position being in alignment wtih said nozzle passageway and facing said heating chamber; and means for moving said plunger within said opening formed in said nozzle, said means for moving being independent of the plastic pressure in said passageway and adapted to move said plunger to a position wherein said nozzle passageway corresponds with said common opening prior to engagement of said sprue with said nozzle.

9. In injection molding apparatus comprising a heating cylinder having an extension member with a passageway formed therein attached to one end thereof, a nozzle attached to said extension member and having a passageway formed therein in alignment with said extension member passageway, means for forcing molten plastic material from said heating cylinder and through said passageways, and a mold having formed therein a sprue which is in communication with said passageway formed in said nozzle, the improvement in a valve means which comprises an opening formed in said extension member, said opening intersecting said passageway through said extension member and having a longitudinal axis which is substantially perpendicular to said extension member passageway; a plunger positioned within said opening, said plunger having formed therein an opening which in one position of said plunger is in alignment with said extension member passageway and said plunger having formed therein a pair of passageways diverging from a common opening on one side of said plunger to a pair of openings on the opposite side of said plunger, the distance between said pair of openings being greater than the diameter of said extension member passageway and said common opening in one position of said plunger being in alignment with said extension member passageway and facing said heating chamber; and means for moving said plunger within said opening formed in said extension member, said means for moving being independent of the plastic pressure in said passageway and adapted to move said plunger to a position wherein said nozzle passageway corresponds with said common opening prior to engagement of said sprue with said nozzle.

10. The apparatus of claim 9 in which said means for moving said plunger comprises a hydraulic cylinder having hydraulic fluid inlet and outlet lines attached thereto; and a piston attached to an end of said plunger, said piston being disposed within said hydraulic cylinder.

References Cited in the file of this patent

UNITED STATES PATENTS

| | | |
|---|---|---|
| 1,744,221 | Gomand | Jan. 21, 1930 |
| 2,279,380 | Reid | Apr. 14, 1942 |
| 2,501,595 | Bohannon | Mar. 21, 1950 |
| 2,668,325 | Goodwin | Feb. 9, 1954 |
| 2,862,241 | De Mattia | Dec. 2, 1958 |
| 2,872,705 | Labarre | Feb. 10, 1959 |
| 2,912,719 | Gilmore | Nov .17, 1959 |

FOREIGN PATENTS

| | | |
|---|---|---|
| 912,194 | France | Aug. 1, 1946 |
| 962,727 | France | Dec. 12, 1949 |
| 890,571 | Germany | Sept. 21, 1953 |
| 555,379 | Italy | Jan. 23, 1957 |